(12) United States Patent
Brandmaier et al.

(10) Patent No.: US 11,353,335 B1
(45) Date of Patent: *Jun. 7, 2022

(54) DRIVING ANALYSIS BASED ON MOVEMENT DATA

(71) Applicant: Allstate Insurance Company, Northbrook, IL (US)

(72) Inventors: Jennifer A. Brandmaier, Chicago, IL (US); Jeffrey Fitzgerald, Vernon Hills, IL (US); Eric D. Huls, Chicago, IL (US); Joseph Kleinhenz, Bollingbrook, IL (US); William Loo, Arlington Heights, IL (US); Matthew James Manzella, Glen Ellyn, IL (US); Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/987,681

(22) Filed: Aug. 7, 2020

Related U.S. Application Data

(63) Continuation of application No. 16/531,563, filed on Aug. 5, 2019, now Pat. No. 10,768,013, which is a
(Continued)

(51) Int. Cl.
*G01C 22/00* (2006.01)

(52) U.S. Cl.
CPC .................... *G01C 22/00* (2013.01)

(58) Field of Classification Search
None
See application file for complete search history.

(56) References Cited

U.S. PATENT DOCUMENTS

| 5,084,821 A | 1/1992 | Ohsuga et al. |
| 5,172,785 A | 12/1992 | Takahashi |

(Continued)

FOREIGN PATENT DOCUMENTS

| DE | 212008000095 U1 | 9/2010 |

OTHER PUBLICATIONS

"Biometric Identification Using Driving Behavioral Signals"; Kei Igarashi et al.; Publication 0-7803-8603-5/04/$20.00 ÃÂ© 2004 IEEE.
(Continued)

*Primary Examiner* — Arleen M Vazquez
*Assistant Examiner* — Brandon J Becker
(74) *Attorney, Agent, or Firm* — Dinsmore & Shohl LLP

(57) ABSTRACT

One or more devices in a data analysis computing system may be configured to receive and analyze movement data, and determine driving trips associated driving data based on the received movement data. Movement data may be collected by one or more mobile devices, such as smartphones, tablet computers, and the like. One or more driving trips may be identified based on the movement data collected by the mobile devices, including acceleration data, speed data, and rotation rate data. After identifying a driving trip, the previously collected movement data and/or additional driving data may be analyzed to determine additional driving trip data, such as the driver, vehicle, and/or additional driving factors.

20 Claims, 7 Drawing Sheets

Related U.S. Application Data continuation of application No. 14/158,388, filed on Jan. 17, 2014, now Pat. No. 10,429,203.

(56) References Cited

U.S. PATENT DOCUMENTS

| | | | |
|---|---|---|---|
| 6,198,996 | B1 | 3/2001 | Berstis |
| 6,810,309 | B2 | 10/2004 | Sadler et al. |
| 7,889,078 | B2 | 2/2011 | Hovden |
| 7,979,207 | B2 | 7/2011 | Chowdhary et al. |
| 8,140,241 | B2 | 3/2012 | Takeda et al. |
| 8,254,011 | B2 | 8/2012 | Baur et al. |
| 8,255,990 | B2 | 8/2012 | Callenryd et al. |
| 8,256,560 | B2 | 9/2012 | Fiske et al. |
| 8,344,849 | B2 | 1/2013 | Larsson et al. |
| 8,525,668 | B1 | 9/2013 | Alouani et al. |
| 2006/0055551 | A1 | 3/2006 | Fries |
| 2011/0182238 | A1 | 7/2011 | Marshall et al. |
| 2012/0029801 | A1 | 2/2012 | Yano et al. |
| 2012/0226421 | A1 | 9/2012 | Kote et al. |
| 2013/0041521 | A1 | 2/2013 | Basir et al. |
| 2013/0135118 | A1* | 5/2013 | Ricci .................. G08C 19/00 340/932.2 |
| 2013/0166201 | A1 | 6/2013 | Paim et al. |
| 2013/0176328 | A1 | 7/2013 | Pillai |
| 2013/0210406 | A1* | 8/2013 | Vidal .................. H04W 4/40 455/418 |
| 2014/0089168 | A1 | 3/2014 | Metz-Galloway et al. |
| 2014/0322676 | A1* | 10/2014 | Raman .............. G09B 19/167 434/65 |

OTHER PUBLICATIONS

"Driver Identification Using Driving Behavior Signals"; webpage www.researchgate.net/publication/31157945_Driver_Identification_Using_Driving_Behavior_Signals; dated Jun. 10, 2013.

"Driver Modeling Based on Driving Behavior and Its Evaluation in Driver Identification," Miyajima et al., Proceedings of the IEEE (vol. 95, Issue:2), Published: Feb. 2007, ISSN: 0018-9219.

"Driver recognition system using fnn and statistical methods"; Abdul Wahab et al.; http://www.springer.com/978-0-387-33503-2;. ISBN: 978-0-387-33503-2, date 2007.

"Driver Recognition Using Gaussian Mixture Models and Decision Fusion Techniques", Kristin S. Benli et al.; Publication, Date unknown but believed to be before filing of Application.

"Experiments on Decision Fusion for Driver Recognition", Hakan Erdogan et al.; Document from Faculty of Engineering; Date unknown.

"Support Vector Machine for Behavior-Based Driver Indentification System," Huihuan Qian et al., Journal of Robotics: vol. 2010, Article ID 397865, Hindawi Publishing Corporation, Mar. 2010.

"Video-Based Driver Identification Using Local Appearance Face Recognition," J. Stallkamp et al.; Document date unknown.

Driver Identification Based on Spectral Analysis of Driving Behavioral Signals; Webpage http://link.springer.com/chapter/10.1007/978-0-387-45976-9_3; date capture Jan. 10, 2014.

Parametric Versus Non-parametric Models of Driving Behavior Signals for Driver Identification, webpage link.springerr.com/chapter/10.1007%2F11527923_77; dated Jun. 10, 2013.

* cited by examiner n = length of windows in seconds
m = sensor interval in seconds
L = floor(n / m)   ← number of data points in the window
$a_x, a_y, a_z, r_x, r_y, r_z$   ← L-dimensional arrays of user acceleration and rotation rate
meanLogR = 0
meanA = 0
meanAsqrd = 0
for i = 1 to L {
$\quad A = \sqrt{a_x(i)^2 + a_y(i)^2 + a_z(i)^2}$
$\quad R = \sqrt{r_x(i)^2 + r_y(i)^2 + r_z(i)^2}$
$\quad$ meanA += A / L
$\quad$ meanAsqrd += $A^2$ / L
$\quad$ meanLogR += log(R)/L
}
logStdA = $\left(\log\left(\sqrt{\text{meanAsqrd} - \text{meanA}^2}\right) + 2.5\right)/3$
meanLogR = (meanLogR + 2.5) / 3 if meanLogR + 1.704 * logStdA > -0.014, turn on app and verify with GPS

DRIVING ANALYSIS BASED ON MOVEMENT DATA

CROSS REFERENCE TO RELATED APPLICATIONS

This application is a continuation of and claims priority to co-pending U.S. patent application Ser. No. 16/531,563, filed Aug. 5, 2019, and entitled "Driving Analysis Based on Movement Data," which is a continuation of and claims priority to U.S. patent application Ser. No. 14/158,388 (now U.S. Pat. No. 10,429,203), filed Jan. 17, 2014 and entitled "Driving Analysis Based on Movement Data," all of which are incorporated hereby by reference in their entirety.

TECHNICAL FIELD

Various aspects of the disclosure generally relate to systems and methods of collecting and analyzing driving data. Specifically, various aspects relate to systems and methods of receiving and analyzing movement data collected by movement sensors at a mobile computing device and identifying driving trips based on the movement data.

BACKGROUND

The ability to collect and analyze driving data and driving behaviors associated with vehicles and drivers has many valuable applications, for example, relating to vehicle and driver insurance, vehicle financing, product safety and marketing, government and law enforcement, and various other applications in other industries. For example, an insurance company may offer a safe driving discount, and a financial institution may offer financing incentives to customers based on driving behavior. Law enforcement or governmental personnel may collect and analyze driving data to identify dangerous driving roads or times, detect moving violations and other unsafe driving behaviors. In other cases, driving data may be used for navigation applications, vehicle tracking and monitoring applications, and vehicle maintenance applications, product sales and targeting advertisement applications, among others.

Vehicle-based computer systems, such as on-board diagnostics (OBD) systems and telematics devices, may be used in automobiles and other vehicles, and may be capable of collecting various driving data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data. Such vehicle-based systems may be capable of collecting driving data which may be used to perform various driving data analyses such as statistical driving evaluations, driver score calculations, etc. However, not all vehicles are equipped with systems capable of collecting, analyzing, and communicating driving data. Moreover, a single vehicle may be used by multiple different drivers, and conversely, a single driver may drive multiple different vehicles. Thus, driving data collected by a vehicle-based system might not completely and accurately reflect a driver's driving behavior.

In contrast to vehicle-based systems, mobile devices such as smartphones, personal digital assistants, tablet computers, and the like, are often carried and/or operated by a single user. Some mobile devices may include one or more movement sensors, such as an accelerometer, gyroscope, speedometer, and/or GPS receivers, capable of detecting movement.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for receiving and analyzing movement data, and for determining driving trips and associated drivers based on the movement data. In some cases, movement data may be collected by one or more mobile devices, such as smartphones, tablet computers, and other mobile devices including movement sensors.

The movement data may include, for example, acceleration data, speed data, rotation rate data, and other movement data recorded by a mobile device. The movement data may be analyzed and one or more driving trips may be identified based on the movement data collected by the mobile device. The analysis, which may be performed by the mobile device or a related data analysis server, may determine driving trips as distinguished from walking, running, train or air travel, and other non-driving movement of the mobile device.

According to additional aspects, after identifying one or more driving trips, the previously collected movement data and/or additional collected driving data may be analyzed to identify drivers, vehicles, routes, driving events and behaviors and/or additional driving data. In some examples, after a driving trip is identified using one or more movement sensors, additional sensors may be activated to confirm and/or collect additional data about the driving trip. Such driving trip data may be used, for example, to update driving records or driver scores, offer insurance and/or other various products and services to drivers.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5C is a software code sample illustrating an example algorithm for a movement data analysis and driving trip determination, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
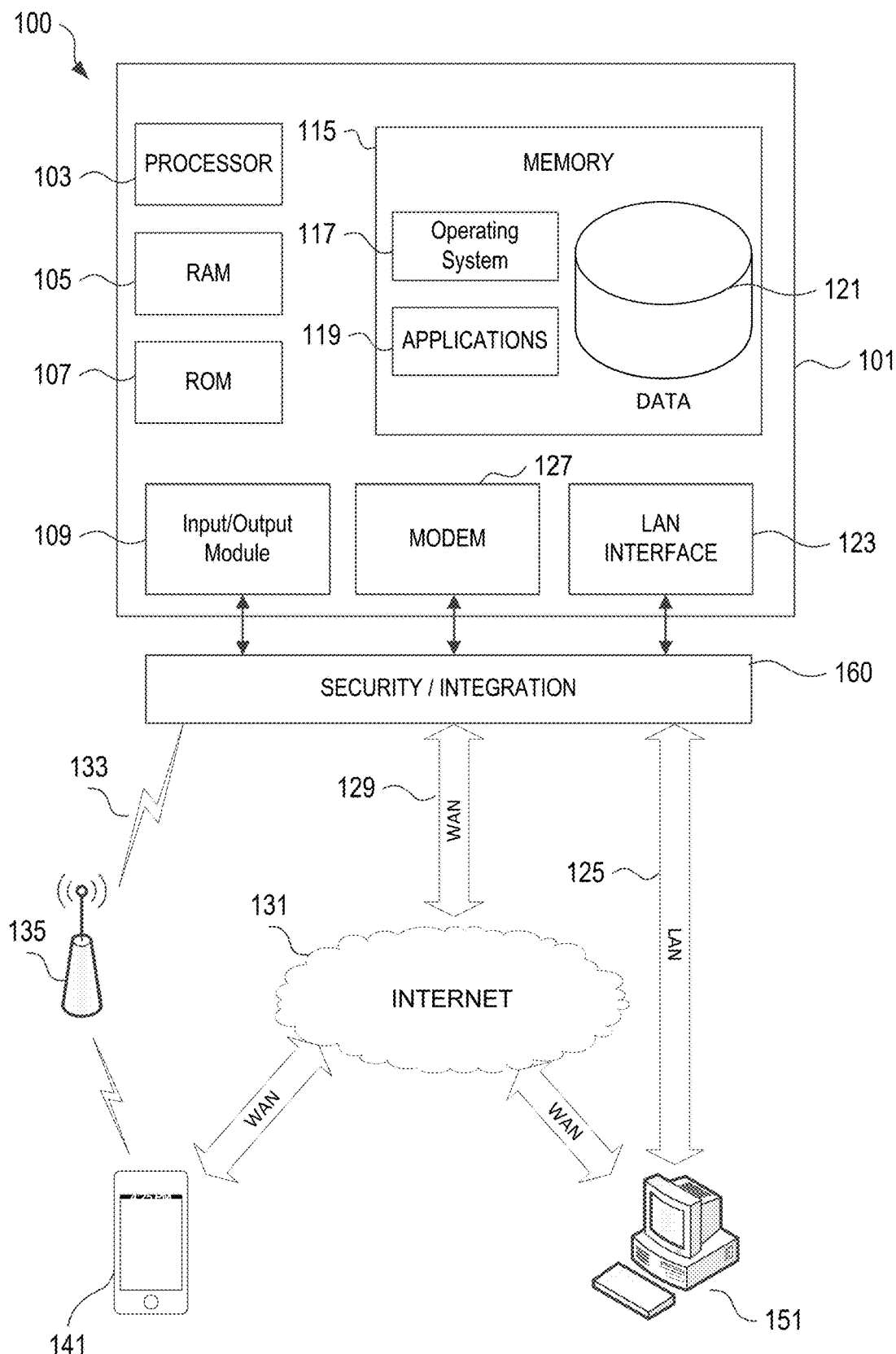
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as a mobile computing device or a driving data analysis server, configured as described herein for receiving and analyzing movement data from mobile device movement sensors, and identifying driving trips associated with the movement data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a movement/driving data analysis system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an insurance provider server 101, a driving data analysis device 101, etc.), in order to store and/or execute a movement data analysis software application, receive and process sufficient amounts of movement data from various sensors at a determined data sampling rate, and analyze movement data to identify driving trips and associated drivers, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to execute a movement data analysis software application that receives and stores data from mobile device movement sensors, analyzes the movement data, and determines driving trips and associated drivers based on the movement data.

The computing device (e.g., a mobile computing device, a driving data analysis server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, on-board vehicle computing systems, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications may be sent and managed between the device 101 (e.g., a user's mobile device, a driving data analysis system, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a driving data analysis server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as driving data analysis server 101. For example, layer 160 may correspond to one or more dedicated web servers and network hardware in an organizational datacenter or in a cloud infrastructure supporting a cloud-based movement data/driving data analysis system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as movement data and location data associated with drivers or vehicles. Therefore, it may be desirable to protect transmissions of such data by using secure network protocols and encryption, and also to protect the integrity of the data when stored on in a database or other storage in a mobile device, driving data analysis server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., movement data, location data, driving schedules or patterns, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers 101 and various clients 141 and 151 (e.g., mobile devices, data analysis servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a movement data database, a driving schedule database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of movement data and driving data collection and analysis systems, such as faster response times and less dependence on network conditions when transmitting/receiving movement data analysis software applications (or application updates), movement data, driving schedule data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within a movement data/driving data analysis system 100 (e.g., movement data analysis software applications), including computer executable instructions for receiving and storing movement data from mobile device sensors, analyzing the movement data to identify driving trips and drivers associated with the movement data, and performing other related functions as described herein.

Figure 2:
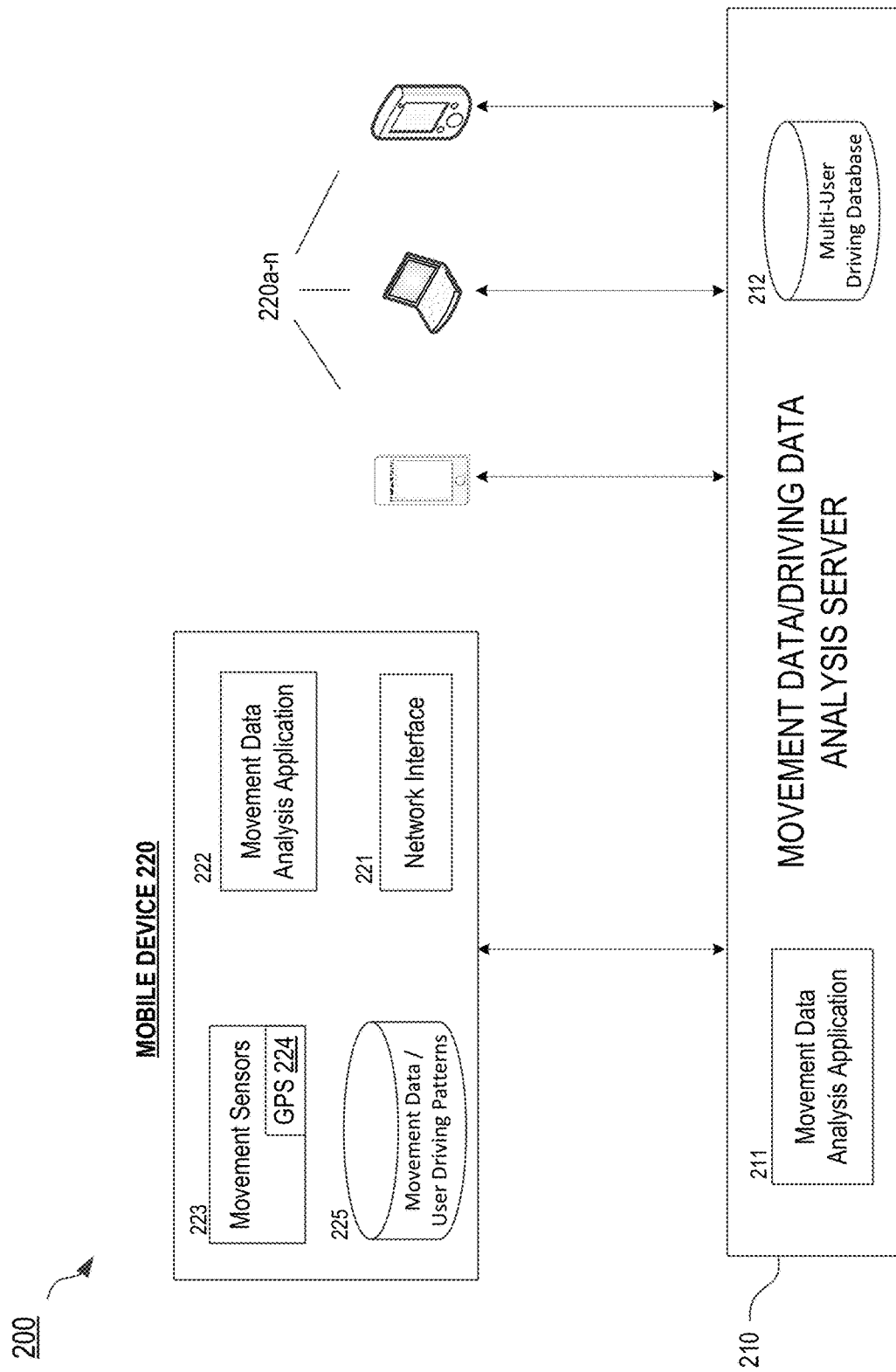
FIG. 2 is a diagram illustrating the components of an example driving trip and driving data analysis system, according to one or more aspects of the disclosure.

FIG. 2 is a diagram of an illustrative movement data/driving data analysis system 200. In this example system diagram, a movement data/driving data analysis server 210 may communicate with a plurality of different mobile computing devices 220, which may include, for example, mobile user devices (e.g., smartphones, personal digital assistants, tablet and laptop computers, etc.) and any other mobile computing devices. Components 210 and 220 shown in FIG. 2 may be implemented in hardware, software, or a combination of the two, and each component of a movement data/driving data analysis system 200 may include a computing device (or system) having some or all of the structural components described above for computing device 101. Additionally, although not shown in FIG. 2, any movement data/driving data analysis system 200 described herein may include various non-vehicle roadway infrastructure devices, such as toll booths, rail road crossings, traffic cameras, and road-side traffic monitoring devices. In various examples, the movement data/driving data analysis servers 210 and/or mobile computing devices 220 may be configured to communicate with such infrastructure devices, which may serve as additional data sources for movement data and/or driving data.

The data analysis server 210 may be, for example, a computer server having some or all of the structural components described above for computing device 101. As described below in more detail, in some cases the data analysis server 210 may be configured to provide movement data analysis software applications to various mobile computing devices 220. The data analysis server 210 also may be configured to receive and analyze movement data (which may or may not correspond to driving data) from mobile computing devices 220, identify driving trips based on the received movement data, and use the identified driving trips and associated driver data to perform additional analyses relating to automobile insurance, financing, product safety and marketing, law enforcement, and various other applications in other industries. In some embodiments, the server 210 may include one or more movement data analysis software applications 211, and one or more driving databases 212. As described below in more detail, the server 210 may distribute a first software application 211 to mobile devices 220, for example, a movement data analysis application 211 (which may be stored as application 222 on the mobile device 220). The movement data analysis application 222 may operate on the mobile device 220 to analyze movement data and determine time periods during which the movement data corresponding to driving trips. After identifying driving trips, one or more software applications 211 operating on the server 210 may be configured to receive analyze the driving trip data and associated driver data from the movement data analysis application 222 on the mobile device 220, store the driving trip data in driving database 212 and/or perform additional analyses on the driving trip data.

In order to perform the functionality described above, and the additional functionality discussed in more detail below, the server 210 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store movement data/driving data analysis applications (e.g., including various different versions, upgrades, etc.), establish communication sessions with and distribute applications to various mobile computing devices 220, and receive and analyze movement data/driving data from the mobile computing devices 220. Additionally, as described below, private and secure data may be transmitted between the data analysis server 210 and various mobile computing devices 220, such as private location data, movement data, and personal driver/customer data, etc. Therefore, in some embodiments, server 210 may include various security and/or integration components (e.g., web servers, authentication servers) and/or various network components (e.g., firewalls, routers, gateways, load balancers, etc.). The server 210 also may provide and/or require communications over certain secure protocols or encryption techniques (e.g., FTP or SFTP, PGP, HTTP or HTTPS, SOAP, XML encryption, etc.), in order to protect the private or secure data transmitted between the server 210 and various mobile computing devices 220.

The movement data/driving data analysis system 200 in these examples may also include a plurality of mobile computing devices 220. As discussed below, in some embodiments, mobile computing devices 220 may receive and execute a movement data analysis software application 222 from the server 210 or other application provider (e.g., an application store or third-party application provider). As part of the execution of the movement data analysis software application 222, or implemented as separate functionality, mobile computing device 220 may receive and analyze movement data from movement sensors 223 of the mobile device 220, identify driving trips based on the received movement data and drivers associated with the driving trips. Accordingly, in some embodiments, a mobile computing device 220 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute one or more such movement data analysis software applications, and to establish communication sessions with a data analysis server 210 and/or various other devices (e.g., on-board vehicle systems, other mobile devices 220, etc.) to transmit or receive movement data/driving data, driving pattern data, etc. Additionally, mobile computing devices 220 may receive and transmit private or secure data, such as private location data, movement data, and personal driver/customer data, etc. Therefore, in some embodiments, mobile computing devices 220 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.), in order to protect the private or secure data transmitted between the mobile device 220 and other devices.

Mobile device 220, which may be a smartphone, personal digital assistant, tablet computer, etc., may include some or all of the elements described above with respect to the computing device 101. In this example, mobile device 220 includes a network interface component 221, which may include various network interface hardware (e.g., LAN interfaces, WAN modems, or wireless transceivers, etc.) and software components to enable mobile device 220 to communicate with one or more movement data/driving data analysis servers 210, other mobile devices 220, and various other external computing devices (e.g., application stores, third-party driving data servers, etc.). As shown in FIG. 2, a movement data analysis software application 222 may be stored in the memory of the mobile device 220. The movement data analysis software application 222 may be received via network interface 221 from server 210 or other application provider (e.g., an application store). In different examples, movement data analysis software application 222 may or may not include various user interface screens, and may be configured to run as a user-initiated application or as a background application. For instance, as discussed below, there may be an initial training period during which a user of the mobile device 220 interacts with user interface screens of the movement data analysis software application 222 to indicate periods of driving and/or not driving. In such cases, the movement data analysis software application 222 may be a user-initiated application during the training period, but may (optionally) switch to execute as a background application after the training period over. When the movement data analysis software application 222 executes as a background application, it may be automatically initiated by the mobile device 220 (e.g., by the operation system), and may be configured continuously or periodically collect movement data, perform driving determinations and the other functions described herein. When operating as a background application 222, these functions may be performed automatically, without any specific user input to launch the movement data analysis software application 222 or perform the functionality of the application described herein.

Mobile computing devices 220 may include one or more movement sensors 223 configured to detect, generate, and collect movement data when the device 220 is moved. Movement sensors 223 may include, for example, accelerometers, gyroscopes, speedometers, compasses, and/or global positioning system (GPS) receivers 224. Additional movement sensors 223 may include certain sensors that might not be specifically designed to detect movement, but nonetheless may be used to detect movement by collecting and analyzing the sensor data over time, for example, cameras, proximity sensors, and various wireless network interfaces capable of detect access to different data networks, mobile networks, and other mobile devices (e.g., via Bluetooth). Different mobile devices 220 may include different sets of movement sensors 223. For instance, one smartphone may include only an accelerometer and a clock to collect and store device acceleration data and corresponding time data, while another smartphone may include an accelerometer, clock, and gyroscope (to collect rotational data), still another smartphone may include an accelerometer and clock, along with a speedometer and compass (to collect speed and directional data). GPS receivers 224 optionally may be integrated into any of the mobile devices 220 described herein.

The memory of the mobile device 220 also may include one or more databases or other storage arrangements 225. Databases 225 may be configured to receive and store, for example, movement data collected by the movement sensors 223 of the mobile device 220, before that data is analyzed using the movement data analysis software application 222. In some cases, database 225 also may store the driving schedules or patterns for one or more users of the mobile device 200. Driving pattern or schedule data may include one or more sets of previous movement data samples collected by the mobile device 220, or driving schedule records including common driving times, and driving trip starting points/destinations associated with one or more users of the mobile device 220. In some examples, the database 225 may exist within the application memory for the movement data analysis software application 222, and in other examples may be stored separately as persistent data within the device memory.

In some examples, the mobile device 200 may be a user device as described above (e.g., a smartphone, personal digital assistant, or tablet computer, etc.) that also may include a vehicle interface component to allow the mobile device to establish communication with an on-board vehicle system. For example, either the mobile device 220 or a vehicle may be implemented with hardware (e.g., an input port or docking station) and/or software (e.g., network interfaces, secure protocols and encryption, etc.), and may be designed and configured to establish communication (using a wired or wireless connection) between the mobile device 220 and an on-board vehicle system. For example, a smartphone or tablet computer 220, which is often carried by a user, may include an on-board vehicle system interface to detect and/or connect to an on-board vehicle system whenever the user is driving (and/or riding as a passenger) in a vehicle. After a mobile device 220 establishes communication with an on-board vehicle system, which may be a telematics device, on-board diagnostic system, vehicle navigation device, or other vehicle computer system, the mobile device 220 may receive vehicle sensor data collected by various vehicle sensors, including a vehicle-based GPS receiver, or any other vehicle sensors. Thus, mobile devices 220 (e.g., smartphones or tablet computers) may use vehicle interfaces to receive some or all of the same vehicle sensor data and driving data that is accessible to on-board vehicle systems 220.

The movement data collected by the movement sensors 223 of the mobile device 220 may be stored in the memory of the mobile device 220 and/or transmitted to the server 210. As described below in reference to FIG. 3, this movement data may be analyzed by the mobile device 220 and/or by server 210 (e.g., using a movement data analysis software application) to determine when the movement data corresponds to a driving trip. Although the examples described below in reference to FIG. 3 primarily refer to certain types of movement data, such as acceleration data, rotation rate data, and time data, it should be understood that the movement data analyzed may include additional types of data such as speed data, direction data, location data (e.g., GPS data), and any other movement data that may be determined from by the sensors 223 of a mobile device 220.

Figure 3:
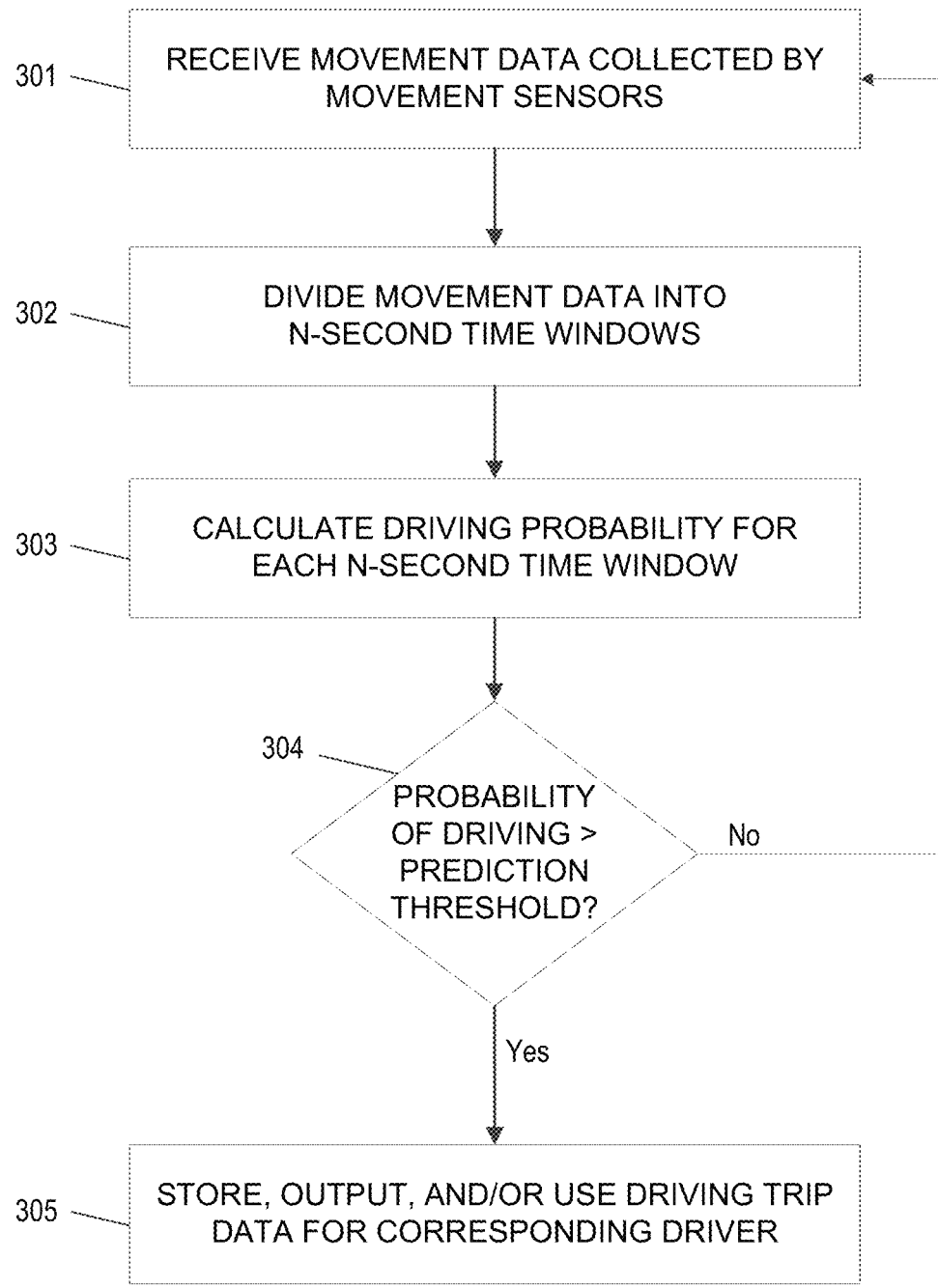
FIG. 3 is a flow diagram illustrating an example process of identifying a driving trip based on received movement data collected by movement sensors of a mobile device, according to one or more aspects of the disclosure.

Referring to FIG. 3, a flow diagram is shown illustrating a process of receiving movement data collected by the movement sensors of a mobile device 220, and analyzing the movement data to identify driving trips corresponding to associated drivers. The steps and various functionality described in reference to FIG. 3 may be performed by a mobile device 220, a movement data/driving data analysis server 210, or a combination of one or more mobile devices 220 and/or servers 210.

In step 301, a set of movement data is received at a computing device, for example, a mobile device 220 or a movement data/driving data analysis server 210. The movement data may correspond to the data collected by movement sensors 223 of a mobile device 220, such as acceleration and time data, along with any other movement data discussed above in reference to FIG. 2. For embodiments in which a movement data analysis is performed on a mobile device 220, step 301 may include the mobile device 220 receiving and locally storing the movement data from its various movement sensors 223. For embodiments in which a movement data analysis is performed on a separate server 210, step 301 may include one or mobile devices 220 collecting, formatting, and transmitting movement data to the server 210, which may receive and store the movement data from the mobile device(s) 220.

In steps 302-304, described below, the movement data received in step 301 may be analyzed and a determination may be made as to whether or not the movement data corresponds to one or more driving trips. In some examples, a movement data analysis software component (e.g., an application) may be executed to analyze input movement data, such as accelerometer and gyroscope sensor data from a small window of time, sampled at a predetermined data sampling rate, and may output a binary classification corresponding to a prediction that the window of time is either a driving trip (a driving window), or is not a driving trip (a non-driving window).

In step 302, the received movement data may initially be divided into one or more n-second time windows. In some cases, an accelerometer, gyroscope, and/or other movement sensor 223 may be configured to store movement data in separate data files corresponding to trips (e.g., continuous periods of time with non-zero movement data, indicating that the mobile device 220 is not merely sitting idle). For example, a set of received data files (e.g., .CSV data files) may include trip-by-trip accelerometer data (e.g., linear accelerations) and/or gyroscope data (e.g., rotation rates) over a period of time corresponding to a trip. At this point, it is not yet known if the trip is a driving trip, walking trip, or some other type of movement of the mobile device 220. Different movement trip files may be pieced together, and then broken into non-overlapping n-second windows including acceleration data, rotation rate data, and/or any other available movement data.

After dividing the movement data into n-second time windows in step 302, the data from each time window may be analyzed, individually or collectively, in step 303. In step 303, the movement data from the n-second time windows may be analyzed as discussed below to calculate a probability that one or more n-second time windows represents a driving time window, for example, as opposed to walking, riding a bicycle, riding on a train, etc.

In some examples, one or more variables may be calculated based on three-dimensional movement data when performing the analysis in step 303. For example, when acceleration data is available from a 3-axis accelerometer (i.e., Ax for x-direction linear acceleration, Ay for y-direction linear acceleration, and Az for z-direction linear acceleration), then an acceleration variable (A) may be calculated using the following equation:

$$A = \sqrt{Ax^2 + Ay^2 + Az^2}$$

As another example, when 3-axis rotational data is available (i.e., Rx, Ry, and Rz), then a rotation rate variable (R) may be calculated using the following equation:

$$R = \sqrt{Rx^2 + Ry^2 + Rz^2}$$

Figure 4A:
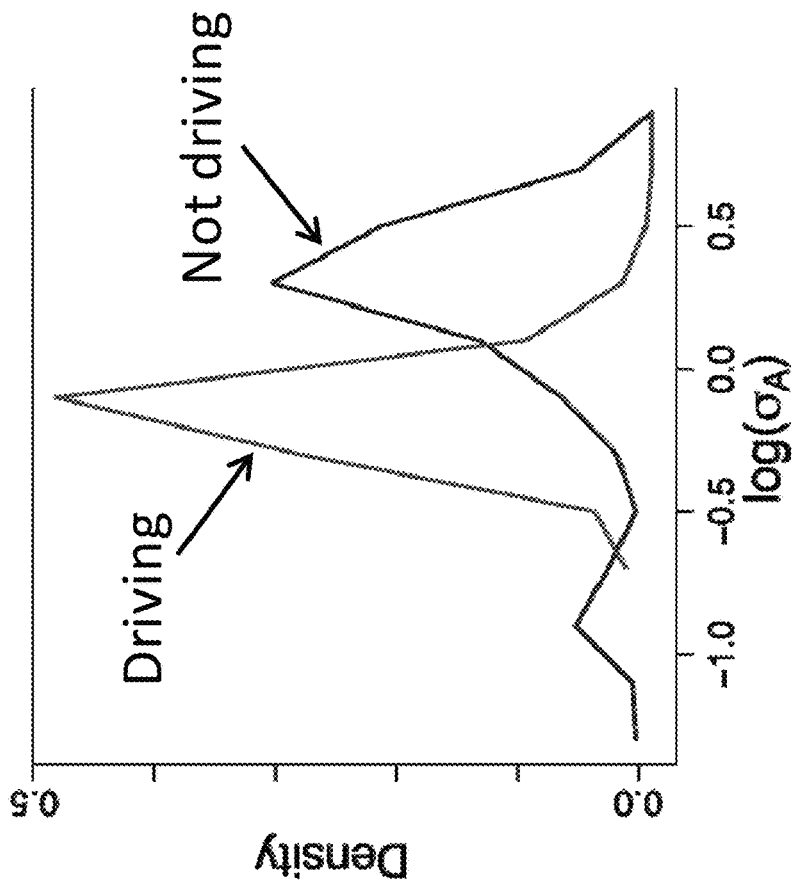
FIGS. 4A and 4B are example graphs illustrating driving probability densities based respectively on acceleration and rotation rate variables, according to one or more aspects of the disclosure.
Figure 4B:
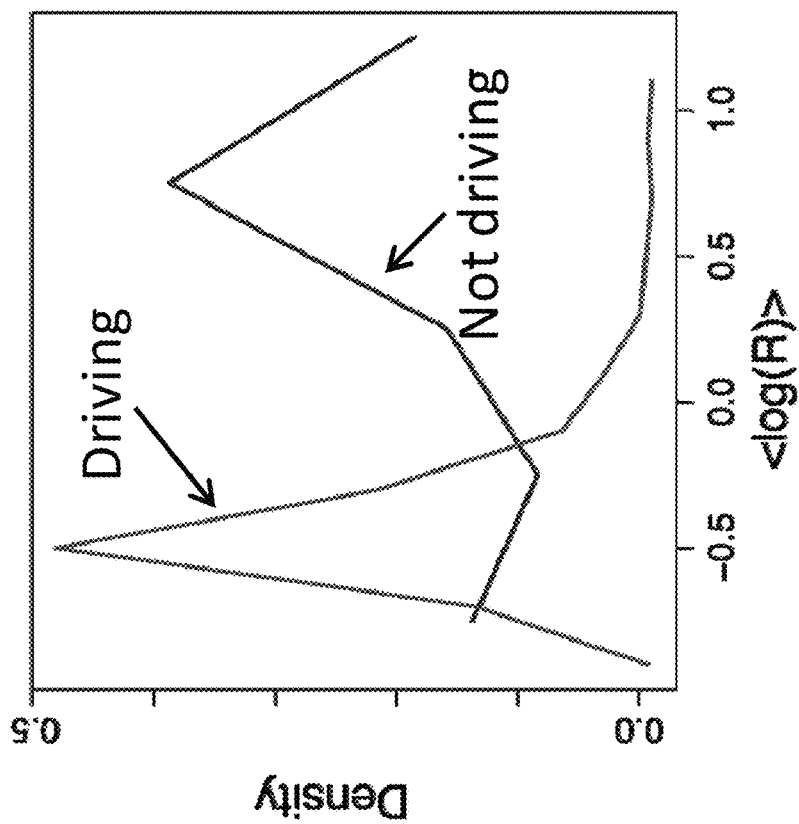

Such variables may be used to determine probability densities between different time windows predicted to be driving and predicted not to be driving. For example, referring now to FIGS. 4A and 4B, two example graphs are shown illustrating driving probability densities for "driving" versus "not driving" time windows. In FIG. 4A, the rotation rate variable (R) is used to chart the probability density between "driving" and "not driving" time windows. In this example $<\log(R)>$, along the x-axis of FIG. 4A, equals the average log(R) value inside a time window. In FIG. 4B, the acceleration variable (A) is used to chart the probability density between "driving" and "not driving" time windows. In this example, $\sigma_a$ is the standard deviation of A.

As these examples illustrate, variables such as the acceleration variable (A) and a rotation rate variable (R) may be calculated based on single-dimensional raw variables (e.g., Ax, Ay, Az, Rx, Ry, and Rz), and these variables then may be used in various equations (e.g., logarithmic equations $<\log(R)>$ and $\log(\sigma_a)$ in these examples) which have been determined based on empirical analysis to create separation between "driving" and "not driving" time windows. A good separation, such as the separations shown between the "Driving" and "Not driving" graphs in FIGS. 4A and 4B, indicates that there is little overlap between P (x|driving) and P (x|not driving).

After calculating the variables, the analysis in step 303 may then use the variables to calculate the probabilities, for one or more of the n-second time windows, that the time window corresponds to a driving trip. In certain examples, a logistic regression may be used to calculate the probability that each n-second time window corresponds to a driving trip (i.e., a "driving" time window). Such probabilities may be modeled using a logistic function, for instance:

$$P(\text{driving} | n - \text{second window}) = \frac{1}{1 + \exp(-\beta 0 - \beta 1 \langle \log(R) \rangle - \beta 2 (\log(\sigma a))^2)}$$

Parameters β0, β1, and β2 in the above example may be determined empirically using a portion of the movement data received in step 301. For instance, the movement data analysis in step 303 may randomly select some portion of the movement data (e.g., 25%, 40%, 50%, etc.) and perform a regression analysis to calculate the values of β0, β1, and β2, while leaving the remaining portion of the movement data for later steps in the analysis, such as determining a prediction threshold and validation processes discussed below. The calculation of parameters β0, β1, and β2 also may depend on the size of the n-second time windows determined in step 302, and the sensor intervals and/or sampling rates within the time windows. For instance, in one example data set, 16-second time windows were used, with 1-second sensor intervals, and a regression analysis was performed with 40% of the received movement data, resulting in the following parameter calculations (β0=0.578, β1=−5.922, and β2=−10.093). Additionally, in certain examples, the parameters and/or the resulting probabilities may be calculated in part based on the previously stored driving schedule data associated one or more drivers or vehicles. Certain time windows may be associated with driving probabilities based on previously stored driving schedule data associated with a driver and/or vehicle. For instance, if a driver commonly drives one or more driving trips between 3-4 PM on weekdays, the parameters and/or driving probabilities associated with time windows between 3-4 PM on weekdays may be adjusted based on the driver's known schedule.

In step 304, the driving probability calculation for each n-second window calculated in step 303 (i.e., P (driving|n-second window)), may be compared to a prediction threshold to determine the n-second window will be determined as corresponding to a driving trip or not. For instance, the logistic function above may determine a probability calculation for a particular driving window of 60%. However, it may be desirable in some implementations to avoid false positives when making a prediction that a time window corresponds to driving. Therefore, in this example, a higher prediction threshold (e.g., 65%, 70%, 90%, etc.) may be established so that a prediction of "driving" is not output for a time window unless the driving probability calculation for the time window (e.g., P (driving|n-second window), calculated as discussed above) exceeds the prediction threshold.

In some cases, rather than setting a predetermined prediction threshold or picking an arbitrary prediction threshold for predicting driving (e.g., 50%, 65%, 70%, 90%, etc.), a prediction threshold first may be calculated in step 304 by analyzing a portion of the movement data received in step 301. For example, as discussed above, a first portion of the received movement data for an n-second time window (e.g., a randomly selected 40% of the movement data) may be used to determine the parameters $\beta 0$, $\beta 1$, and $\beta 2$ for the driving probability calculation (i.e., P (driving|n-second window)) for the n-second time window. In this example, a second portion of the same received movement data (e.g., a randomly selected 30% of the movement data) may be used to determine a driving prediction threshold using a driving prediction threshold function. As discussed below, the remaining 30% of the movement data in this example may be used for validation. However, in other examples, different percentages of randomly selected movement data may be used for (1) determining the parameters $\beta 0$, $\beta 1$, and $\beta 2$ for the driving probability calculation (e.g., a randomly selected 10%, 20%, 30%, 50%, etc., of the movement data), (2) calculating the prediction threshold for predicting driving (e.g., a randomly selected 10%, 20%, 30%, 50%, etc., of the movement data), and/or (3) validating the model (e.g., a randomly selected 10%, 20%, 30%, 50%, etc., of the movement data, or the remaining unused portion of the movement data).

For examples in which some portion of the received movement data is used to calculate the driving prediction threshold, step 304 may include generating a driving prediction threshold function, f (threshold), and using the threshold function to determine a driving prediction threshold value. In some embodiments, a driving prediction threshold function may be calculated as the following equation:

$$f(\text{threshold}) = T(\text{threshold}) - \sqrt{F(\text{threshold})}$$

In this example, f (threshold) corresponds to the driving prediction threshold function, T is the fraction of "driving" time windows predicted correctly as driving windows, and F is the fraction of "not driving" time windows incorrectly predicted (i.e., predicted as driving). Thus, by using this equation on the received movement data (or a portion of the received movement data), the f (threshold) is increased upon a correct prediction of "driving" for a time window, but is reduced more aggressively for false positives (i.e., incorrect predictions of "driving").

Figure 5A:
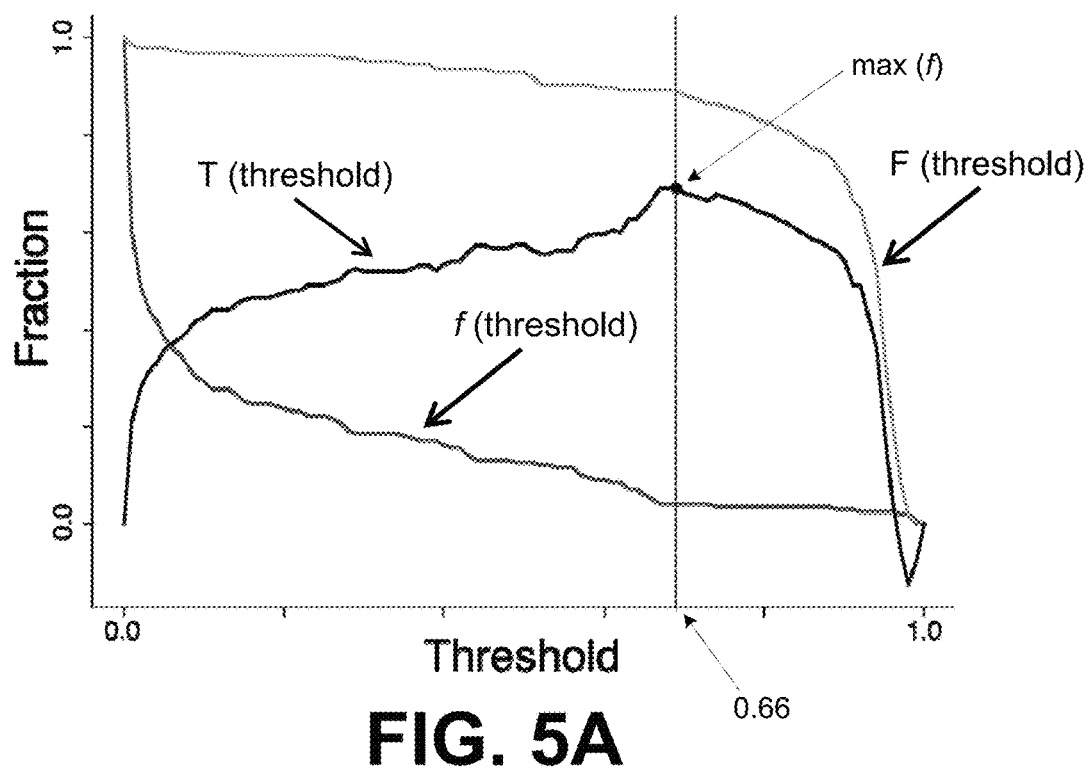
FIG. 5A is an example graph illustrating a function to determine a driving prediction threshold, according to one or more aspects of the disclosure.

Referring now to FIG. 5A, a graph is shown illustrating the calculation of f (threshold) based on the above equation. In this example, as shown in FIG. 5A, the maximum f (threshold) value, 0.66 in this example, corresponds to the greatest difference between the fraction of "driving" time windows predicted correction, and the square root of the fraction of "not driving" time windows incorrectly predicted. Thus, in this example, the max (f) of 0.66, or 66%, may be selected as the optimal prediction threshold for predicting whether a time window is "driving" or "not driving."

Figure 5B:
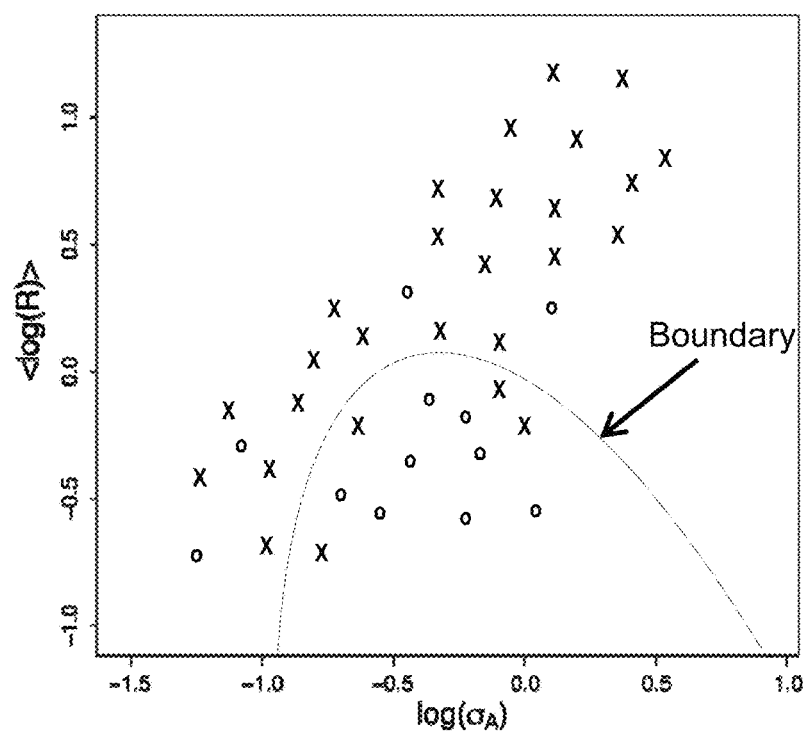
FIG. 5B is an example graph illustrating a driving prediction model, according to one or more aspects of the disclosure.

Continuing with the analysis in step 304, a binary output (i.e., 304:No or 304:Yes) corresponding to a prediction of either driving or not driving may be determined for each n-second time window, based on the driving probability calculation for that time window (e.g., P (driving| n-second window) as discussed above) and the determined prediction threshold (e.g., max (f) as discussed above). For example, referring now to FIG. 5B, a data graph is shown illustrating the results of such a driving prediction model. In this example, a plurality of time windows of movement data have been analyzed and graphed using axes <log(R)> and log($\sigma_a$), discussed above. Each time window is represented on the graph by either an X (indicating a not driving time window) or an O (indicating a driving time window). The boundary line indicated in FIG. 5B is a graphical representation that combines a driving probability calculation (e.g., P (driving|n-second window, discussed above) and a driving prediction threshold (e.g., f (max), discussed above). In this example, any time window data point within the boundary line will be predicted as a corresponding to a driving trip, while any time window data point outside of the boundary line will be predicted as not corresponding to a driving trip. As illustrated in this example, it might not be possible in some cases to predict driving or not driving with complete accuracy, but using one or more of the techniques discussed herein for determining movement variables, calculating driving probabilities, and using a driving prediction threshold, it may be possible to accurately predict whether or not a time window corresponds to a driving trip for a high percentage of movement data time windows.

In some examples, after creating a driving prediction model, as discussed above, the model may be tested, revised, and/or validated by further analysis of the movement data received in step 301 and/or additional related movement data. As discussed above, in some cases a certain percentage of randomly selected movement data may be used for model validation after the driving probability calculations and prediction threshold calculations have been performed. For example, a remaining portion (e.g., 30%) of the movement data that was not used to create the driving prediction model may be used to validate the model. Additionally, different time window sizes and/or sensor reading intervals may be tested during the model validation to identify preferable or optimal time window sizes (e.g., 10 seconds, 15 seconds, 30 seconds, etc.) and sensor reading intervals (e.g., 0.5 seconds, 1 second, etc.). The model validation and the determination of the time window size and sensor reading interval may be performed until values are found corresponding to a combination of a relatively high true positive faction (i.e., the percentage of "driving" windows that the model predicts as driving) value and a relatively low false positive fraction (i.e., the percentage of "not driving" windows that the model predicts as driving).

An example algorithm illustrating the movement data analysis and driving trip determination of steps 302-304 is provided in FIG. 5C. This algorithm provides a specific example incorporating several of the concepts discussed above, and it should be understood that different specific code implementations, algorithmic steps, and parameter values may be used in other examples and embodiments.

In some cases, the movement data analysis and driving trip determination of steps 302-304 may include multiple different analyses and determinations corresponding to different drivers, different driver-vehicle combinations, and corresponding to other different factors. For example, a single mobile device 220 may be shared by different individuals (e.g., family members, co-workers) having different driving schedules, habits, and behaviors. In this example, step 303 may include calculating different driving probabilities for the different individuals. Additionally, a single user of the mobile device 220 may frequently drive different cars having different movement characteristics (e.g., speed, acceleration and braking, suspension, etc.), and thus step 303 also may include calculating different driving probabilities for the same individual driving different vehicles. Thus, step 304 may include multiple comparisons one or more driving prediction thresholds against driving probabilities calculated in step 303 representing driving probabilities for different drivers, driver-vehicle combinations, and/or other driving factors, such as weather, traffic, passengers in vehicle, time and locations of driving, etc.

Calculations of driving probability also may be based on driver training data and/or other data sources. Such driver training data (e.g., including training movement data corresponding different drivers, driver-vehicle combinations, and/or other driving factors), may be collected, analyzed, and stored in advance, prior to the steps discussed in FIG. 3. During the training process, drivers may interact with a user interface of a movement data analysis application 222, after the application is installed on their mobile device 220. Drivers may identify themselves, their vehicles, and/or other driving factors (e.g., current weather, road conditions, routes driven, etc.) at the beginning and/or ends of driving trips during an initial training period. During the training period, the movement data analysis application 222 may collect and analyze the movement data during periods when a user has indicated (via a user interface) that the mobile device 220 is in an vehicle being driven, and likewise may collect and analyze additional movement data during periods when the mobile device is not in a vehicle being driven. Training periods may last a predetermined amount of time (e.g., a numbers of days or weeks), a predetermined amount of driving time (e.g., a number of driving hours), or a predetermined number of driving trips. Movement data collected during a training period corresponding to driving and not driving may be stored locally on the mobile device 220 (e.g., in database 225) and/or may be transmitted to and stored on a movement data/driving data analysis server 210 (e.g., in database 212).

In step 305, after identifying one or more driving trips (304:Yes) based on the received movement data, the driving trip data and other related data (e.g., driver data, vehicle data, driving factor data etc.) may be stored or output via the server 210, mobile device 220, or other computing device in a movement data or driving data analysis system. For example, if a positive determination of a driving trip (304: Yes) is performed on a mobile device 220, then in step 305, data indicating the driving trip and additional information identifying the driver, vehicle, and other trip details (when available) may be transmitted to the movement data/driving data analysis server 210 and stored in driving database 212. In such examples, the mobile device 220 may be pre-programmed with device user information (e.g., name, customer identifier, account number, etc.), and so may automatically transmit the driving trip details (e.g., driver, driving trip time and length, etc.) to the server 210 upon detection of a driving trip.

In some embodiments, in response to identifying driving trip, a movement data analysis application 211 or 222 may be configured to retrieve and/or analyze additional information relating to the driving trip. For example, a mobile device 220 may include one or more movement sensors 223 that consume relatively small amounts of power during activation and operation, such as an accelerometer and/or a gyroscope, along with additional movement sensors 223 that consume larger amounts of power, such as GPS receiver 224. In such examples, the mobile device 220 may be configured to perform steps 301-304 by regularly or continuously operating the low-power movement sensors 223, and analyzing the movement data from these sensors to identify driving trips in real time or near-real time. Then, after a driving trip is identified based on the low-power movement sensor data (304:Yes), the mobile device 220 in step 305 may be configured to activate the additional higher-power sensors to collect additional movement data and/or other types of data for driving pattern analyses and driver determinations. For instance, a mobile device 220 may be configured to perform the determination of step 304 using only movement data from an accelerometer and/or gyroscope 223, and then in response to identifying one or more driving trips (304:Yes), activate a GPS receiver 224 to perform additional functions such as verifying the driving trip, identifying the driver, and/or performing various driving determinations (e.g., evaluating driving trip speed, acceleration and braking patterns, accidents or high-risk driving behaviors, etc.) Additionally, in some examples, in response to identifying a driving trip (304:Yes), the mobile device 220 may be configured to search for and establish communication with an on-board vehicle system such as a telematics device, on-board diagnostic system, vehicle navigation device, or other vehicle computer system. After establishing communication with an on-board vehicle system in step 305, the mobile device 220 may receive vehicle sensor data collected by various vehicle sensors, including a vehicle-based GPS receiver, or any other vehicle sensors. Thus, step 305 may include activation of additional sensors and/or establishment of new communication sessions in order to retrieve and analyze driving data corresponding to the driving trip identified in step 304.

The driving trip data received and/or analyzed in in step 305 may be stored or output via the server 210, mobile device 220, or other computing device in a movement data/driving data analysis system. For example, after identifying a driving trip, a mobile device may be configured to log the driving trip data (e.g., trip time, length, and driver) in a local driving database 225, or transmit the driving trip data to a server 210 for storage and analysis. As described above, additional types driving trip data may be retrieved and analyzed in some examples after a driving trip has been identified, for instance, by retrieving data from additional mobile sensors 223, GPS 224, and/or establishing a connection to a vehicle system. Such additional data may correspond to measurements of accident-free driving, safe driving, or unsafe driving that are determined for the driving trip, based on factors such as the detection of a vehicle impact, air bag deployment, skidding or swerving, average driving speed, use of seatbelts, turn signals and other vehicle controls, traffic and weather conditions, detections of tailgating, intoxication, moving violations, and other safe or unsafe driving behaviors. Additional driving data stored/output in step 305 may relate to the times and locations driven, choices of routes taken, radio stations listened to, and any other factors relating to driving behaviors or driver preferences.

The driving data stored/output in step 305, when associated with the corresponding driver and/or vehicle data determined in steps 303 and 304, may have many different applications and may be provided to many different entities. For example, after identifying a driving trip in step 304, and then retrieving additional driving data from the driving trip, the driving trip data may be transmitted to various entities and used for various different purposes, such as vehicle or driver insurance or financing (e.g., driving data indicating safe or unsafe driving), law enforcement (e.g., driving data indicating moving violations), and product retail or marketing entities (e.g., driving data indicating a driver's driving behaviors and habits, such as radio stations and ads listened to, routes driven and stops made, etc.).

To illustrate, in certain examples the movement data/driving data analysis server 210 may correspond to an insurance company server. In such examples, the insurance company may operate a movement data analysis software application 211, and may distribute corresponding software applications 222 to customers or potential customers of the insurance company. Databases 212 and/or 225 may be used to movement data, customer driving patterns, and records of driving trips of insurance company customers. In these examples, the data stored/output in step 305 may allow the insurance company server 210 to identify a customer (or potential customer) as a driver of a driving trip, and then use the corresponding driving data to determine driving frequency and driving behaviors of the customer, and detect accidents and safe or unsafe driving behaviors by the customer. Such determinations may allow the insurance company to adjust the customer's driver score, offer insurance rate discounts, suggest new insurance plans and products that may be advantageous based on the customer's driving habits, etc. Although this example relates to an insurance company, it should be understood that similar systems may be implemented by banks and financial institutions, law enforcement and governmental entities, and various retail entities, to offer targeted products, services, or incentives based on driving data.

As discussed above in reference to FIG. 3, the receipt and analysis of movement data, identification of driving trips, and determination of associated drivers and driving data, may be performed entirely by either a movement data/driving data analysis server 210 or by a mobile device 220 executing a movement data analysis software application 222. Alternatively, server 210 may be configured to receive and analyze movement data from various mobile devices 220, and may entirely perform the driving trip identifications and analysis of driving trip data, while only using the mobile devices 220 to collect the data. In still other examples, as discussed below in reference to FIG. 6, a movement data/driving data analysis server 210 may work in combination with one or more mobile devices 220 to collect and analyze movement data, identify driving trips, and retrieve and analyze driving data.

Figure 6:
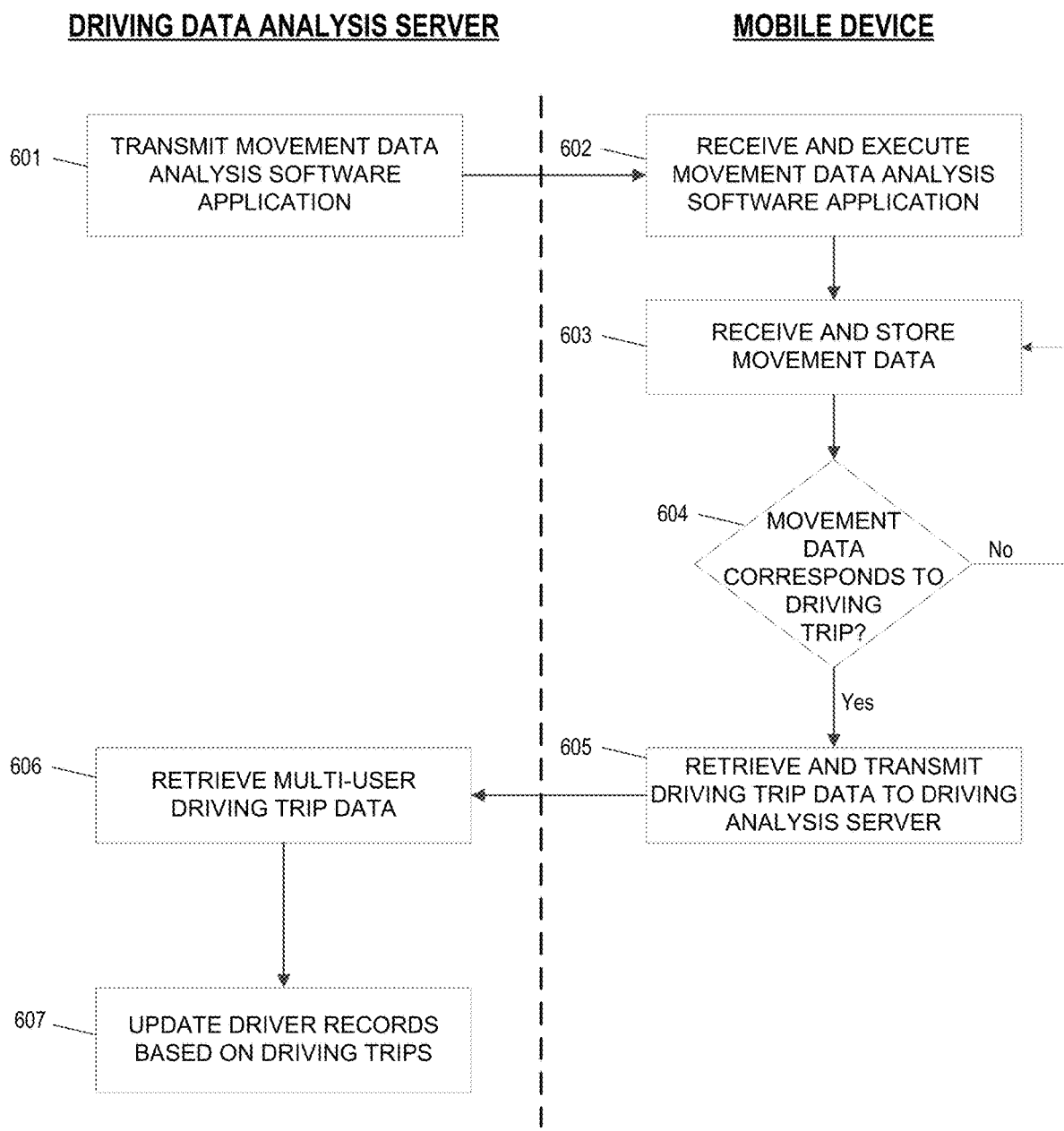
FIG. 6 is a flow diagram illustrating another example of collecting movement data at a mobile device, and using the movement data to identify a driving trip and determine a driver associated with the driving trip, according to one or more aspects of the disclosure.

Referring now to FIG. 6, another example is shown illustrating a process of analyzing movement data, identifying driving trips, and retrieving and analyzing associated driving trip data. The process illustrated in FIG. 6 may be implemented in various different movement/driving data analysis systems including, as in this example, one or more driving data analysis servers 210 and/or mobile devices 220.

In step 601, a movement data/driving data analysis server, such as server 210 described above, may transmit a movement data analysis software application to one or more mobile devices 220 (e.g., smartphones, tablet computers, etc.). Step 601 may be optional in certain embodiments, and in some cases, a movement data analysis software application need not be transmitted to the mobile device 220. Rather, the mobile device 220 may be configured to collect and transmit movement data without needing a specialized software application from server 210. For instance, a mobile device 220 may use a third-party movement data collection application, a web-based interface, and/or may use predetermined formats and protocols for collecting and transmitting movement data, instead of using a movement data analysis software application 222 from a server.

In step 602, the mobile device 220 may receive and execute the movement data analysis software application 222, and in step 603, the movement data analysis software application 222 may control the mobile device to receive and store movement data. In some examples, step 603 may be similar or identical to step 301, discussed above. For instance, the mobile device 220 may execute the received movement data analysis software application 222 and/or perform other techniques to collect the movement data from any of the movement sensors 223 and other movement data sources discussed above (e.g., accelerometer, gyroscope, speedometer, GPS receiver 224, etc.). As discussed above in step 301, the movement data collected may be stored in a secure memory on the mobile device 220, or may be stored off-device in a separate secure data repository.

In step 604, the mobile device 220 may analyze the movement data and determine whether or not the movement data corresponds to a driving trip. In some examples, step 604 may be similar or identical to steps 302-304, discussed above. For instance, one or more of the process steps discussed above may be used to analyze the movement data collected by the mobile device, and to identify driving trips within the movement data as distinguished from walking, running, train or air travel, and other non-driving movement of the mobile device 220.

In step 605, after identifying one or more driving trips within the movement data (604:Yes), the mobile device 220 may retrieve additional data corresponding to the driving trip, and transmit the driving trip data to the movement data/driving data analysis server 210. Retrieving the additional driving data by the mobile device 220 may be similar or identical to the retrieving of driving data discussed above in step 305. For example, in some cases, the driving data transmitting in step 605 may be the same as the movement data received in step 603 (e.g., acceleration data, rotation rate data, speed data, etc.), while in other cases additional driving data may be collected by accessing and/or activating/or additional sensors at the mobile device 220, and/or by establishing communication with a vehicle-based system to obtain additional driving trip data. As discussed above, the additional driving data retrieved in step 605 may be data used to determine driving data or behaviors. For instance, insurance companies, financial institutions, law enforcement entities, and other organizations may be interested in different types of driving data which may be used in various ways after a driving trip has been identified. Thus, different organizations may provide different versions of movement data/driving data analysis software applications 211 to mobile devices 220 in order to collect the desired types of relevant movement and driving data (e.g., GPS data, safe or unsafe driving behavior data, vehicle control usage data, etc.).

Also in step 605, the mobile device 220 may transmit the driving trip data received or collected at the mobile device 220 to the driving analysis server 210. In some cases, one or more mobile devices 220 (e.g., smartphones, tablet computers, etc.) each may transmit their driving data to multiple different servers 210 (e.g., different insurance provider servers 210, governmental servers, business or other organizational servers 210, etc.) in step 605, so that multiple different organizations may use their various computing systems to separately analyze the movement data/driving data and to perform additional analyses and relevant driving determinations. When transmitting the movement data/driving data, mobile devices 220 and/or servers 210 may use, for example, secure data transmission protocols and/or encryption, such as FTP, SFTP, and/or PGP encryption. In some examples, a secure web service may be provided by a server 210 (e.g., an insurance provider server 210), using SSL, TLS, HTTP, and/or HTTPS for transmitting the movement data and/or driving data.

In some embodiments, the driving data transmitted in step 605 may correspond to raw movement data and/or driving data collected by the various sensors 223 in step 603. For example, the mobile device 220 may format, compress, and/or transmit raw driving data such as acceleration/deceleration data, rotation rate data, speed data, and time data, as well as vehicle location data and times, vehicle operational data (e.g., braking, steering, RPMs, etc.), driving behavior data (e.g., turn signal, seat belt and radio usage, driver distraction data, etc.), and any other driving data discussed above. In other cases, the mobile device 220 may be configured to analyze the raw driving data, and then generate and transmit only summary data, for example, averages of miles driven per day/week/month/etc., average driving speeds, average driving acceleration, braking, and steering patterns, average driving times, turn signal and seat belt usage patterns, average driving road and weather conditions, and the like, to a driving data analysis server 210. Additional driving data and driving behaviors may be detected, stored, and transmitted, including, for example, adaptive cruise control activation, electronic stability control, lane departure activation, blind spot detector activation, and other features implemented by various car manufacturers relating to the handling of a vehicle and/or providing feedback to the driver while driving.

Additionally, the mobile device 220 may transmit driving data to the server 210 while continuing to collect and analyze additional movement data and/or driving data. In some cases, the mobile device 220 may continuously collect and analyze movement data and periodically transmit movement data/driving data each time a new driving trip is identified based on the movement data.

In step 606, the driving data analysis server 210 (e.g., an insurance provider server 210 or other organizational server 210) may receive and store the transmitted driving data from the mobile device 220, and/or from a plurality of other mobile devices 220. In step 607, the driving data analysis server 210 may analyze the driving trip data received from the mobile devices 220, and may update one or more driver records based on the driving data associated with the driving trips. Updating driver records may include related steps to those discussed above in step 305. For example, if the movement data/driving data analysis server 210 corresponds to an insurance provider server 210, than updating the driver records in step 607 may include updating the driver's driver score, offering insurance rate discounts, or suggesting new insurance plans and products that may be advantageous to the driver, based on the received driving trip data. For instance, existing insurance customers may be offered rate discounts or credits based on the received driving trip data, while non-customers may be offered specific insurance products and rate quotes as incentives to sign up for a new policy, based on the received driving trip data. Additionally, although these examples relate to driver records updated by an insurance company, it should be understood that similar systems may be implemented by banks and financial institutions, law enforcement and governmental entities, and various retail entities, to maintain driver data and offer targeted products, services, or incentives based on driving data.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A computing device, comprising:
one or more hardware memory units; and
one or more processors;
wherein the computing device is configured to access and employ the memory units and processors to:
automatically initiate a movement data analysis software application, the movement data analysis software application being configured to receive movement data collected by one or more movement sensors of the computing device, the one or more movement sensors of the computing device being configured to detect and collect movement data of the computing device when the computing device is moved;
analyze the received movement data to determine a binary output, the binary output including one of: the received movement data corresponds to movement of the computing device in an automobile during a first driving trip or the received movement data corresponds to movement of the computing device not in an automobile and during a non-driving trip;
responsive to determining that said received movement data corresponds to movement of the computing device in an automobile during the first driving trip:
store and output data corresponding to the first driving trip;
activate at least one additional movement sensor, the at least one additional movement sensor being a vehicle-based sensor different from the one or more movement sensors of the computing device;
initiate a communication session with a vehicle-based computer system in communication with the vehicle-based sensor and different from the computing device to obtain additional data from the at least one additional movement sensor;
analyzing the received movement data and additional data; and
updating a driver score for a driver of the automobile during the first driving trip based on the analyzed received movement data and additional data; and
responsive to determining that said received movement data does not correspond to movement of the computing device in an automobile during the first driving trip receive additional movement data collected by one or more movement sensors of the computing device.

2. The computing device of claim 1, wherein the computing device is a mobile computing device and wherein the one or more movement sensors comprising at least one of a gyroscope, an accelerometer, a speedometer, or a global positioning system (GPS) receiver.

3. The computing device of claim 2, wherein the mobile computing device is further configured to access and employ the memory units and processors to:
collect a first portion of said movement data using a first movement sensor of the mobile computing device while the at least one additional movement sensor is in an inactive state, wherein the determination that said movement data corresponds to movement of the computing device in an automobile during the first driving trip is based on the first portion of said movement data;
in response to determining that said movement data corresponds to movement of the computing device in an automobile during the first driving trip, activate the at least one additional movement sensor; and after the at least one additional movement sensor is activated, collect a second portion of said movement data using the at least one additional movement sensor, wherein the second portion of said movement data is used to determine driving data associated with the first driving trip.

4. The computing device of claim 1, wherein determining that said movement data corresponds to movement of the computing device in an automobile during the first driving trip comprises:

calculating an acceleration variable based at least on first acceleration data corresponding to acceleration in a first axis direction, and second acceleration data corresponding to acceleration in a second axis direction; and calculating a rotation rate variable based at least on first rotation rate data corresponding to rotation around a first axis, and second rotation rate data corresponding to rotation around a second axis.

5. The computing device of claim 1, wherein determining that said movement data corresponds to movement of the computing device in an automobile during the first driving trip comprises:

analyzing acceleration data and rotation data collected during a window of time; and determining the binary output based on the analysis of the acceleration data and rotation data collected during the window of time.

6. The computing device of claim 5, wherein determining the binary output further comprises:

calculating a probability that the acceleration data and rotation data collected during the window of time correspond to driving; and comparing the probability to a driving prediction threshold.

7. The computing device of claim 1, wherein the movement of the computing device not in an automobile and during the non-driving trip includes movement during at least one of: a walking event, an air travel event, and a train travel event.

8. A method, comprising:

automatically initiating a movement data analysis software application, the movement data analysis software application being configured to receive movement data of the movement data analysis computing device from one or more movement sensors of the movement data analysis computing device;

analyzing the received movement data to determine a binary output, the binary output including one of: the received movement data corresponds to a movement of the movement data analysis computing device in an automobile during a first driving trip or the received movement data corresponds to movement of the movement data analysis computing device not m an automobile and during a non-driving trip; and if it is determined that said movement data corresponds to movement of the movement data analysis computing device in an automobile during the first driving trip:

outputting, by the movement data analysis computing device, data corresponding to the first driving trip;

activating at least one additional movement sensor, the at least one additional movement sensor being a vehicle-based sensor different from the one or more movement sensors of the movement data analysis computing device;

initiating a communication session with a vehicle-based computer system in communication with the vehicle-based sensor and different from the movement data analysis computing device to obtain additional data from the at least one additional movement sensor;

analyzing the received movement data and additional data; and updating a driver score for a driver of the automobile during the first driving trip based on the analyzed received movement data and additional data; and if it is determined that said received movement data does not correspond to movement of the movement data analysis computing device in an automobile during the first driving trip receive additional movement data collected by one or more movement sensors of the movement data analysis computing device.

9. The method of claim 8, wherein the movement data analysis computing device is a mobile computing device and wherein the one or more movement sensors comprising at least one of a gyroscope, an accelerometer, a speedometer, or a global positioning system (GPS) receiver.

10. The method of claim 8, further comprising:

collecting a first portion of said movement data using a first movement sensor of the movement data analysis computing device while the at least one additional movement sensor is in an inactive state, wherein the determination that said movement data corresponds to movement of the data analysis computing device in an automobile during the first driving trip is based on the first portion of said movement data;

in response to determining that said movement data corresponds to movement of the movement data analysis computing device in an automobile during the first driving trip, activating the at least one additional movement sensor; and after the at least one additional movement sensor is activated, collecting a second portion of said movement data using the at least one additional movement sensor, wherein the second portion of said movement data is used to determine driving data associated with the first driving trip.

11. The method of claim 8, wherein determining that said movement data corresponds to movement of the movement data analysis computing device in a vehicle during the first driving trip comprises:

calculating an acceleration variable based at least on first acceleration data corresponding to acceleration in a first axis direction, and second acceleration data corresponding to acceleration in a second axis direction; and calculating a rotation rate variable based at least on first rotation rate data corresponding to rotation around a first axis, and second rotation rate data corresponding to rotation around a second axis.

12. The method of claim 8, wherein determining that said movement data corresponds to movement of the movement data analysis computing device in an automobile during the first driving trip comprises:

analyzing acceleration data and rotation data collected during a window of time; and determining the binary output based on the analysis of the acceleration data and rotation data collected during the window of time.

13. The method of claim 12, wherein determining the binary output further comprises:
  calculating a probability that the acceleration data and rotation data collected during the window of time correspond to driving; and
  comparing the probability to a driving prediction threshold.

14. The method of claim 8, wherein the movement of the movement data analysis computing device not in an automobile and during the non-driving trip includes movement during at least one of: a walking event, an air travel event, and a train travel event.

15. A system, comprising:
  a driving data analysis server; and
  one or more mobile computing devices,
  wherein the driving data analysis server comprises:
    one or more processors;
    one or more nonvolatile hardware memory units; and
    one or more networking components,
    wherein the driving data analysis server is configured to access and employ the memory units and processors to:
      transmit a movement data analysis software application, via the one or more networking components, to the one or more mobile computing devices; and
  wherein each of the one or more mobile computing devices comprises:
    one or more volatile hardware memory units, the memory units configured to receive and store movement data; and
    one or more, said processors configured to analyze movement data;
  wherein each of the mobile computing devices is configured to receive, store, and execute the movement data analysis software application, and said movement data analysis software application is programmed to access and employ the memory units and processors of the mobile computing device to:
    automatically initiate the movement data analysis software application, the movement data analysis software application being configured to receive movement data collected by one or more movement sensors of the mobile computing device, the one or more movement sensors of the mobile computing device being configured to detect and collect movement data of the mobile computing device when the mobile computing device is moved;
    analyze the received movement data to determine a binary output, the binary output including one of: the received movement data corresponds to movement of at least one mobile computing device in an automobile during a first driving trip or the received movement data corresponds to movement of the at least one mobile computing device not in an automobile and during a non-driving trip; and
    responsive to determining that said received movement data corresponds to movement of the at least one mobile computing device in an automobile during the first driving trip:
      transmit output data corresponding to the first driving trip to the driving data analysis server;
      activate at least one additional movement sensor, the at least one additional movement sensor being a vehicle-based sensor different from the one or more movement sensors of the mobile computing device;
      initiate a communication session with a vehicle-based computer system in communication with the vehicle-based sensor and different from the mobile computing device to obtain additional data from the at least one additional movement sensor;
      analyze the received movement data and additional data; and
      update a driver score for a driver of the automobile during the first driving trip based on the analyzed received movement data and additional data; and
    responsive to determining that said received movement data does not correspond to movement of the at least one mobile computing device in an automobile during the first driving trip receive additional movement data collected by one or more movement sensors.

16. The system of claim 15, wherein the movement data analysis software application is further programmed to access and employ the memory units and processors of the mobile computing device to:
  collect a first portion of said movement data using a first movement sensor of the mobile computing device while the at least one additional movement sensor is in an inactive state, wherein the determination that said movement data corresponds to movement during the first driving trip is based on the first portion of said movement data;
  in response to determining that said movement data corresponds to movement during the first driving trip, activate the at least one additional movement sensor; and
  after the at least one additional movement sensor is activated, collect a second portion of said movement data using the at least one additional movement sensor, wherein the second portion of said movement data is used to determine driving data associated with the first driving trip.

17. The system of claim 15, wherein the movement of the computing device not in an automobile and during the non-driving trip includes movement during at least one of: a walking event, an air travel event, and a train travel event.

18. The system of claim 15, wherein determining that said movement data corresponds to movement of the at least one mobile computing device in an automobile during the first driving trip comprises:
  calculating an acceleration variable based at least on first acceleration data corresponding to acceleration in a first axis direction, and second acceleration data corresponding to acceleration in a second axis direction; and
  calculating a rotation rate variable based at least on first rotation rate data corresponding to rotation around a first axis, and second rotation rate data corresponding to rotation around a second axis.

19. The system of claim 15, wherein determining that said movement data corresponds to movement of the at least one mobile computing device in an automobile during the first driving trip comprises:
  analyzing acceleration data and rotation data collected during a window of time; and
  determining the binary output based on the analysis of the acceleration data and rotation data collected during the window of time.

20. The system of claim 19, wherein determining the binary output further comprises:
  calculating a probability that the acceleration data and rotation data collected during the window of time correspond to driving; and
  comparing the probability to a driving prediction threshold.

* * * * *